Aug. 26, 1969     S. J. STORTZ, SR     3,463,262
VEHICLE CONTROL SAFETY LOCK DEVICE
Original Filed Aug. 24, 1965
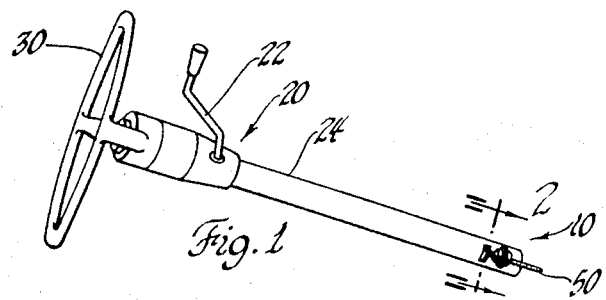
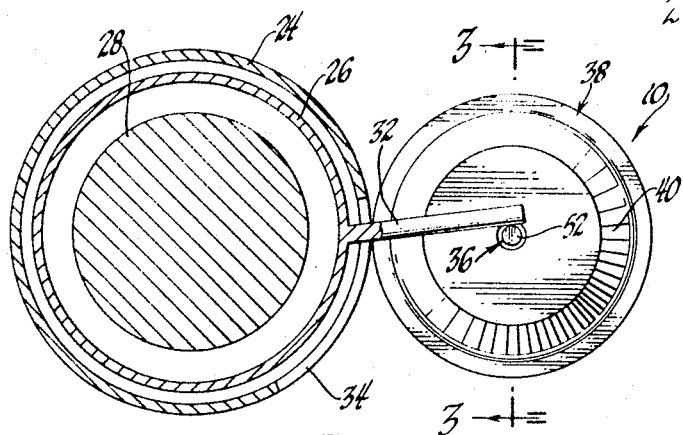
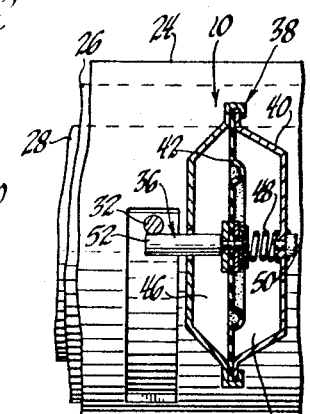
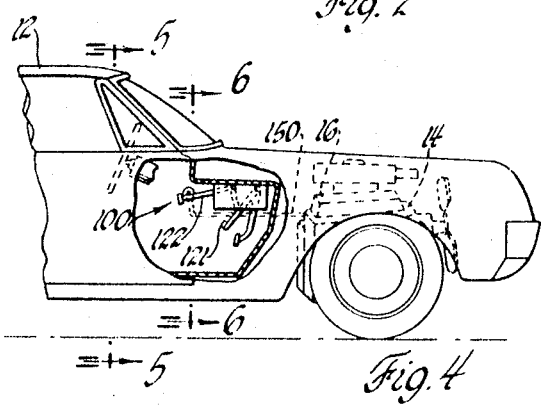
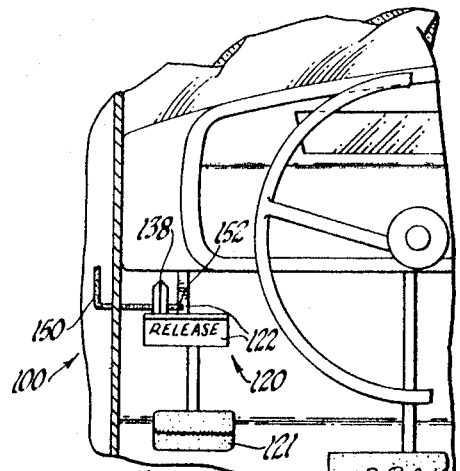
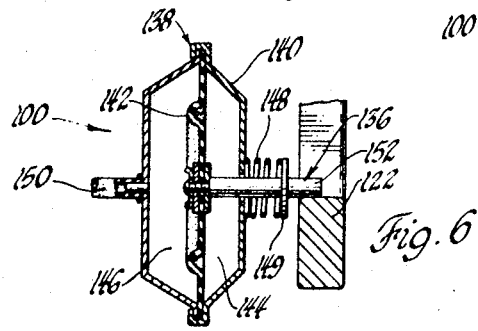
INVENTOR.
Stephen J. Stortz, Sr.
BY Bernard, McGlynn & Reising
ATTORNEYS 3,463,262
VEHICLE CONTROL SAFETY LOCK DEVICE
Stephen J. Stortz, Sr., 12267 Marla Drive,
Warren, Mich. 48093
Original application Aug. 24, 1965, Ser. No. 482,178, now Patent No. 3,370,671, dated Feb. 27, 1968. Divided and this application Nov. 3, 1967, Ser. No. 680,400
Int. Cl. B60t 7/12, 13/46; E05b 65/12
U.S. Cl. 180—82                                                    6 Claims

ABSTRACT OF THE DISCLOSURE

A vacuum-operated safety locking mechanism in a vehicle to prevent the movement of the parking brake release lever when the engine of the automobile is not running.

---

This application is a division of Ser. No. 482,178, filed Aug. 24, 1965, now Patent No. 3,370,671.

There are various mechanisms known in the prior art which utilize the vacuum created by the engine in an automobile to operate or actuate various devices. For example, it is known to utilize the vacuum created by the engine in an automobile to lock the brakes of the automobile when the engine is started to prevent unauthorized movement of the automobile. Yet in other instances, vacuum-operated mechanisms are utilized to hold the brake pedal in an automobile down and locked when the engine of the automobile is not running. Other vacuum mechanisms have been utilized to operate the emergency brake. Yet other vacuum-operated mechanisms have heretofore been utilized to disengage or release the emergency brake when the engine of the automobile is started.

The vacuum-operated mechanisms heretofore utilized in the prior art for performing these various functions are, however, each distinct in their construction and operation and require special structure in the automobile for their operation. That is to say, due to the distinct arrangement of components of the various vacuum-operated mechanisms known in the prior art, they are not suitable or adaptable to be installed in an automobile after the automobile has left the factory for operation in cooperation with the standard components utilized in most automobiles. Furthermore, the various vacuum-operated mechanisms heretofore known in the prior art are normally constructed to actuate or engage and disengage various systems in the automobile. That is to say, vacuum-operated mechanisms heretofore known are not adaptable for incorporation into an automobile to cooperate with the standard equipment on the automobile to provide a safety locking mechanism which merely prevents movement of the parking brake release lever, or the transmission selector lever, when the engine of the automobile is not in operation.

Accordingly, it is an object and feature of this invention to provide a safety locking mechanism adaptable for installation in an automobile to cooperate with either the parking brake release lever or the transmission selector lever to prevent movement thereof when the engine of the automobile is not in operation.

In general, these and other objects and features of this invention may be attained by a safety locking mechanism in combinaion with a vehicle having an engine with an intake manifold and control means for releasing the vehicle movement preventing system. The vehicle movement preventing system usually comprises a parking brake or the park position of the transmission. In the case of the parking brake, the control means is a parking brake release lever which is utilized to release the parking brake. The transmission is placed in the park position by a control means including a transmission selector lever which is normally movably disposed on the steering column of the automobile. The safety locking mechanism includes a diaphragm disposed in a housing to divide the housing into first and second chambers with a pneumatic line connecting the intake manifold of the engine with the first chamber and a plunger attached to the diaphragm and extending through the second chamber to the exterior of the housing. The housing may be attached to the automobile body adjacent the parking brake release lever so that the plunger engages the parking brake release lever when the engine is not running to prevent release of the parking brake. Alternatively, the housing may also be disposed so as to cooperate with the transmission selector lever to prevent movement of the transmission selector lever from the park position when the engine is not running. When the automobile engine is started, a vacuum moves the diaphragm and hence retracts the plunger into the housing so that the parking brake release lever may be moved to release the parking brake, or the transmission selector lever may be manually moved from the park position. Thus, the instant invention may be utilized to prevent the release of the parking brake, or the movement of the transmission selector lever from the parked position, when the engine is not operating, but does not release the parking brake or move the transmission selector lever when the engine is started.

Other objects and attendant advantages of this invention will be readily appraciated as the same becomes better understood by reference to the following detailed description when considered in connection with the accompanying drawings wherein:

FIGURE 1 is an isometric view of a preferred embodiment of the present invention;

FIGURE 2 is an enlarged cross-sectional view taken substantially along line 2—2 of FIGURE 1;

FIGURE 3 is a cross-sectional view taken substantially along line 3—3 of FIGURE 2;

FIGURE 4 is an environmental view of another preferred embodiment of the present invention;

FIGURE 5 is an enlarged cross-sectional view partly broken away and taken substantially along line 5—5 of FIGURE 4; and FIGURE 6 is an enlarged cross-sectional fragmentary view taken substantially along line 6—6 of FIGURE 4.

Referring now to the drawings, a safety locking mechanism constructed in accordance with the instant invention is shown generally at 10 in FIGURES 1 through 3 and generally at 100 in FIGURES 4 through 6. The safety locking mechanisms 10 and 100 are respective embodiments of the instant invention shown in combination with a vehicle such as the automobile 12 shown in FIGURE 4. The automobile 12 includes a power plant comprising an internal combustion engine shown in phantom at 14 with an intake manifold shown in phantom at 16.

Referring now to the embodiment of the invention shown in FIGURES 1 through 3, there is illustrated a control means generally to 20 for releasing a vehicle movement preventing system. The vehicle movement preventing system connects the wheels of the automobile to the transmission and includes the transmission which is selectively operable to prevent rotation of one or more of the wheels of the vehicle. The control means 20 includes a transmission selector lever 22 which is disposed for movement on a steering column casing 24, the steering column being the well known type disposed in a vehicle for steering the vehicle. The transmission selector lever 22 is operatively connected to the transmission of the vehicle through a tubular member 26 which is disposed for rotation within the steering column casing 24. The tubular member 26 rotates about the steering shaft 28 which is connected to the steering wheel 30. The transmission selector lever 22 is movable to a position in which the vehicle is prevented from moving, such position normally being called the park position in most automobiles. A locking arm means 32 is attached to the transmission selector lever 22 in that it is secured to the tubular member 26. The locking arm means 32 extends through a slot 34 in the steering column casing 24 for abutting engagement with an actuated means, generally shown at 36, to prevent movement of the transmission selector lever 22 from the park position until the engine is operated, which will become more fully clear hereinafter.

The safety locking mehcanism 10 includes an actuating means, generally shown at 38, which is adapted to be operatively connected to the power plant of the vehicle for actuation upon operation of the power plant, and the actuated means, generally shown at 36, which is connected to the actuating means and cooperates with the control means for preventing manual release of the vehicle movement preventing system until the power plant of the vehicle is operating. The actuating means 38 includes vacuum responsive means in communication with the intake manifold, such as manifold 16, and includes a sealed housing 40, a diaphragm 42 disposed in the housing 40 to divide the housing into first and second chambers 44 and 46 respectively, a biasing means comprising the spring 48 for urging the diaphragm 42 to move into the second chmaber 46, and a pneumatic line 50 connecting the intake manifold of the engine of the automobile to the first chamber 44 so that a vacuum exists in the chamber 44 when the engine of the automobile is running. When a vacuum exists in the chamber 44, the diaphragm 42 moves to the right as viewed in FIGURE 3. The actuated means 36 comprises a plunger 52 which is attached to the diaphragm 42 and extends through and away from the housing 40 for engaging the locking arm means 32 of the control means 20.

In the operation of the embodiment illustrated in FIGURES 1 through 3, the diaphragm 42 is normally in the position as illustrated in FIGURE 3 when the engine of the automobile is not running so that the plunger 52 engages the locking arm means 32 to prevent rotation of the tubular member 26 and, hence, the selector lever 22, when the selector lever 22 is in the park position. When the engine of the automobile is started or operated, a vacuum is applied to chamber 44 to move the diaphragm 42 to the right as viewed in FIGURE 3 to withdraw the plunger 52 into the housing 40 to disengage the plunger 52 from the locking arm means 32. Therefore, once the engine of the automobile is operating, the transmission selector lever 22 may be manually operated to release the vehicle movement preventing system which is in operation when the transmission selector lever 22 is in the park position. It is to be noted that the safety locking mechanism 10 merely prevents movement of the transmission selector lever 22 when the engine of the automobile is not running, and once the engine of the automobile is operated, it is still necessary for the operator to manually move the transmission lever from the park position.

Referring now to FIGURES 4 through 6 wherein another preferred embodiment of the safety locking mechanism is shown at 100 in combination with a vehicle 12 having a power plant comprising the internal combustion engine 14 and intake manifold 16 attached thereto. A control means, generally shown at 120, is utilized to release the vehicle movement preventing system which, in the embodiment of FIGURES 4 through 6, is the parking brake. More specifically, the control means 120 includes a parking brake applying means 121 and a parking brake release lever 122. The parking brake applying means 121 is illustrated as a foot pedal of the type frequently utilized in automobiles for applying the parking brake by pushing the pedal downward with the foot. When the parking brake applying means 121 is moved downward by the foot of the operator of the vehicle, it remains down until released by movement of the parking brake release lever 122 which is operatively connected to the parking brake applying means 121 for releasing the parking brake applying means.

The safety locking mechanism 100 includes an actuating means, generally shown at 138, which is operatively connected to the engine 14 for actuation upon operation of the engine 14, and an actuated means 136 connected to the actuating means 138 and cooperating with the control means 120 for preventing manual release of the vehicle movement preventing system until the engine of the automobile is operating. The actuating means 138 includes a vacuum responsive means comprising a sealed housing 140, a diaphragm 142 disposed in the housing to divide the housing into first and second chambers 144 and 146 respectively, biasing means comprising the spring 148 disposed between the housing 140 and a flange 149 to urge the diaphragm 142 to move into the second chamber 144, and a pneumatic line 150 connecting the intake manifold 16 and the first chamber 146. The actuated means 136 comprises the plunger 152 which is disposed for abutting engagement with the parking brake release lever 122 to prevent movement of the parking brake release lever 122 in an upward direction, which would release the parking brake applying means 121, until the engine 14 is operated.

More specifically, in the operation of the embodiment illustrated in FIGURES 4 through 6, the diaphragm 142 remains in the position illustrated in FIGURE 6 so that the plunger 152 engages the parking brake release lever 122 to prevent upward movement thereof when the engine 14 of the automobile is not operating. Once the engine 14 of the automobile is started, a vacuum is transmitted to chamber 146 to move the diaphragm 142 to the left as viewed in FIGURE 6 to disengage the plunger 152 from the parking brake release lever 122 so that the parking brake release lever 122 may be manually actuated to release the vehicle movement preventing system comprising the parking brake. It is to be understood that once the engine of the automobile is started, the plunger 152 disengages the parking brake release lever 122 and the parking brake remains engaged and is not released until the operator of the automobile manually moves the parking brake release lever 122.

It is to be understood that a safety locking mechanism may be combined with various components in various embodiments to prevent movement of the control means which releases a vehicle movement preventing system when the engine of the vehicle is not operating. It will also be apparent to those of skill in the art that the instant invention is readily adapted for incorporation into an automobile to cooperate with the standard components utilized in automobiles and need not be incorporated into the automobile during the manufacture of the automobile.

The invention has been described in an illustrative manner and it is to be understood that the terminology which has been used is intended to be in the nature of words of description rather than of limitation.

Obviously, many modifications and variations of the present invention are possible in light of the above teachings.

The embodiments of the invention in which an exclusive property or privilege is claimed are defined as follows:

1. In a vehicle having a safety locking mechanism, a power plant, a vehicle movement preventing ssytem, actuating means adapted to be operatively connected to said power plant for actuation upon operation of said power plant, and actuated means connected to said actuating means and cooperating with said vehicle movement preventing system for preventing manual release thereof until said power plant is operating, said vehicle movement preventing system including a parking brake release lever operatively connected to said vehicle for releasing said vehicle movement preventing system, and said actuated means being disposed to engage said parking brake release lever until said power plant is operated for preventing movement of said parking brake release lever which would release said vehicle movement preventing system.

2. In a vehicle as set forth in claim 1 including a parking brake applying means, said parking brake release lever being operatively connected to said parking brake applying means for releasing said parking brake applying means upon manual actuation thereof.

3. In a vehicle as set forth in claim 2 wherein said actuated means includes a plunger for engaging said parking brake release lever.

4. In a vehicle as set forth in claim 3 wherein said actuating means includes a vacuum responsive means in communication with said power plant, and said plunger is connected to said vacuum responsive means.

5. In a vehicle as set forth in claim 4 wherein said power plant comprises an internal combustion engine having an intake manifold, said vacuum responsive means being in communication with said intake manifold.

6. In a vehicle as set forth in claim 5 wherein said vacuum respsonive means comprises a sealed housing, a diaphragm disposed in said housing to divide said housing into first and second chambers, biasing means urging said diaphragm to move into said second chamber, and a pneumatic line connecting said intake manifold and said first chamber of said housing, said plunger being attached to said diaphragm and extending through and away from said housing for engaging said parking brake release lever.

References Cited
UNITED STATES PATENTS

| | | | |
|---|---|---|---|
| 1,726,530 | 9/1929 | Gillen. | |
| 1,875,686 | 9/1932 | White | 70—254 |
| 1,967,151 | 7/1934 | Lustick | 70—237 |
| 1,972,300 | 9/1934 | Hemingway | 70—254 |
| 2,890,581 | 6/1959 | Lewis. | |
| 2,968,378 | 1/1961 | Yanda. | |
| 2,976,744 | 3/1961 | Hinsey | 74—531 |
| 3,119,477 | 1/1964 | Ryder | 192—3 |
| 3,367,208 | 2/1968 | Fender | 74—531 |

KENNETH H. BETTS, Primary Examiner

U.S. Cl. X.R.

70—237; 180—114